F. G. SALERNO.
MACHINE FOR DEPOSITING CONFECTIONS ON WAFERS, CAKES, AND THE LIKE.
APPLICATION FILED APR. 27, 1914.
1,303,599.
Patented May 13, 1919.
13 SHEETS—SHEET 5.
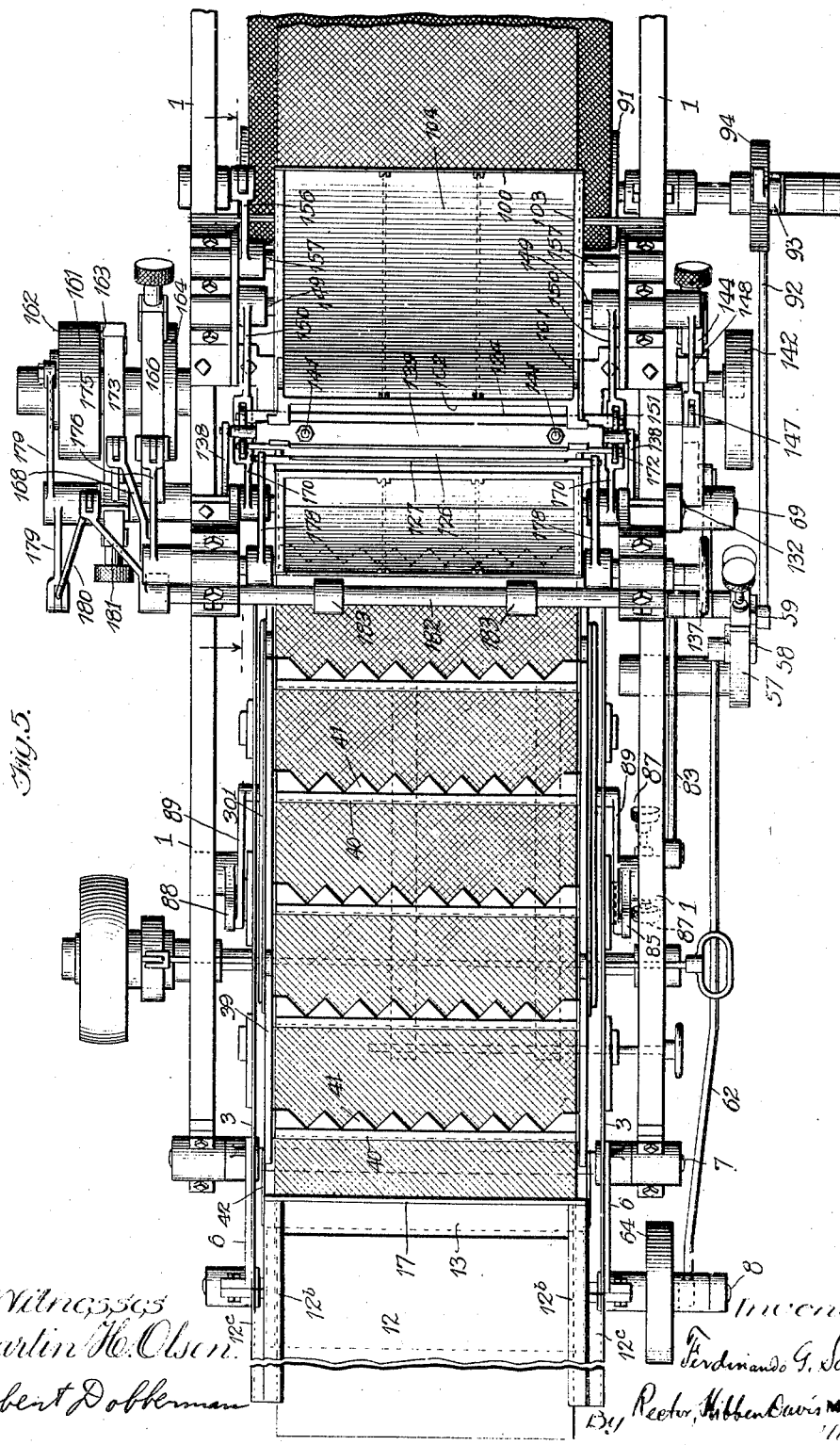

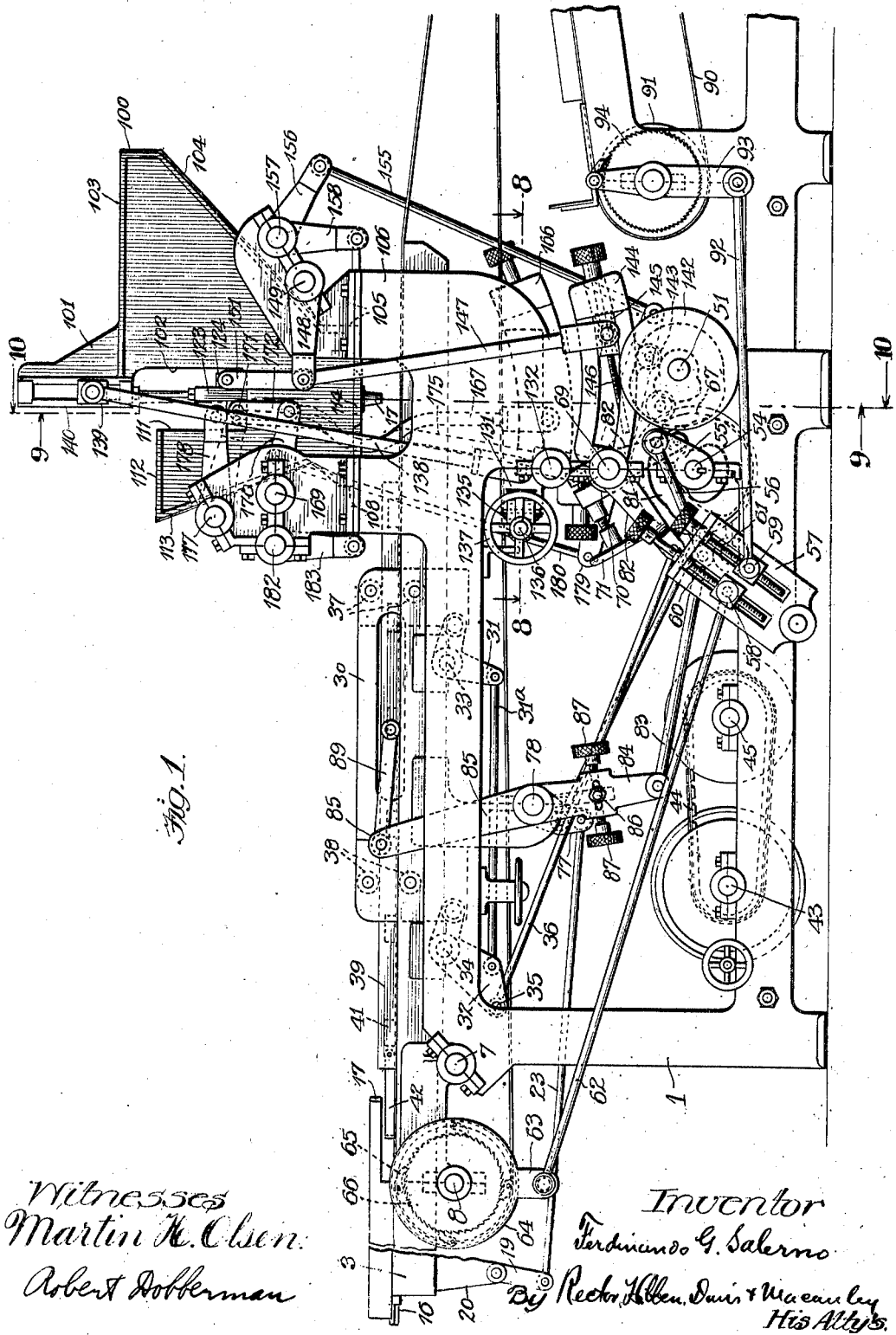

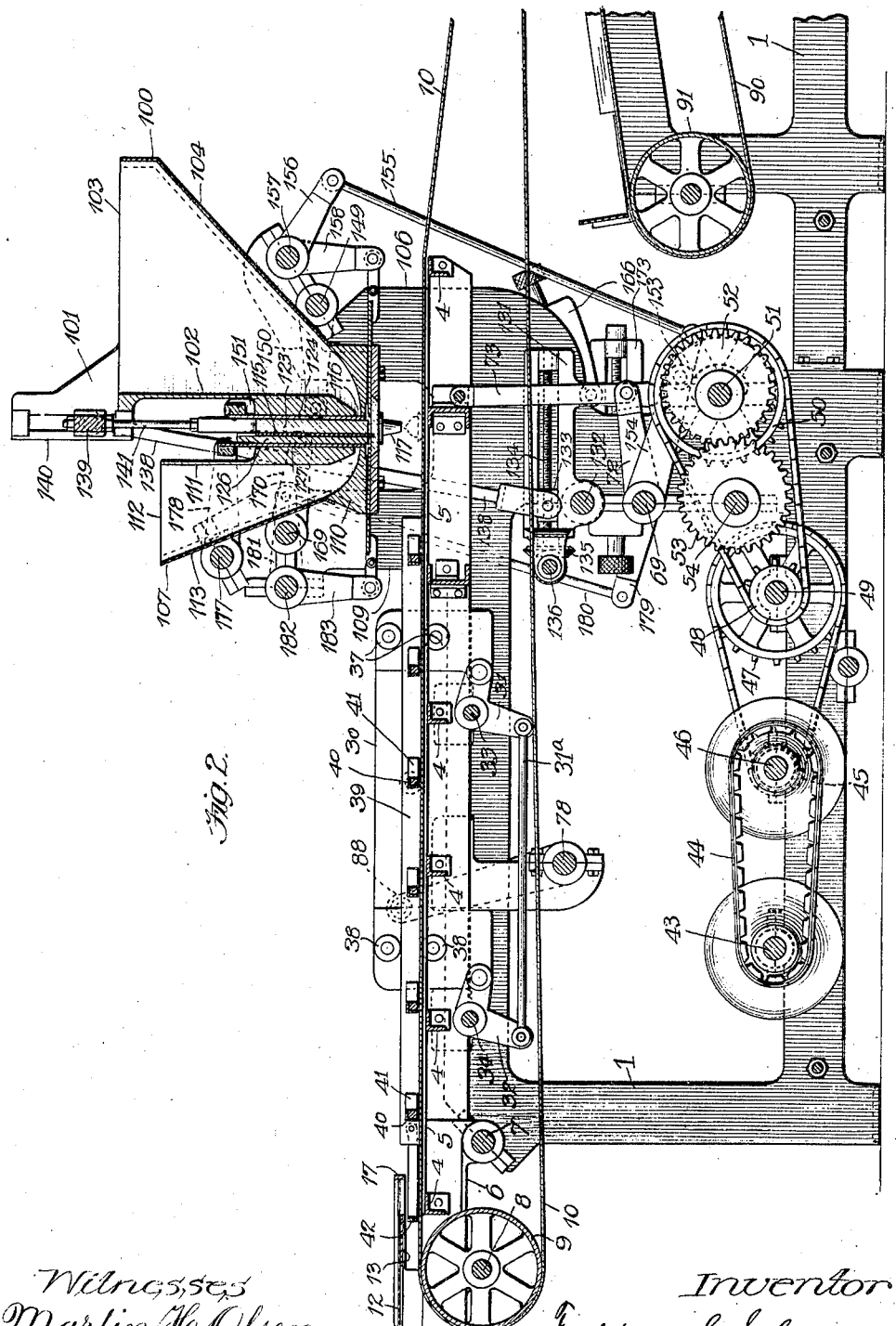

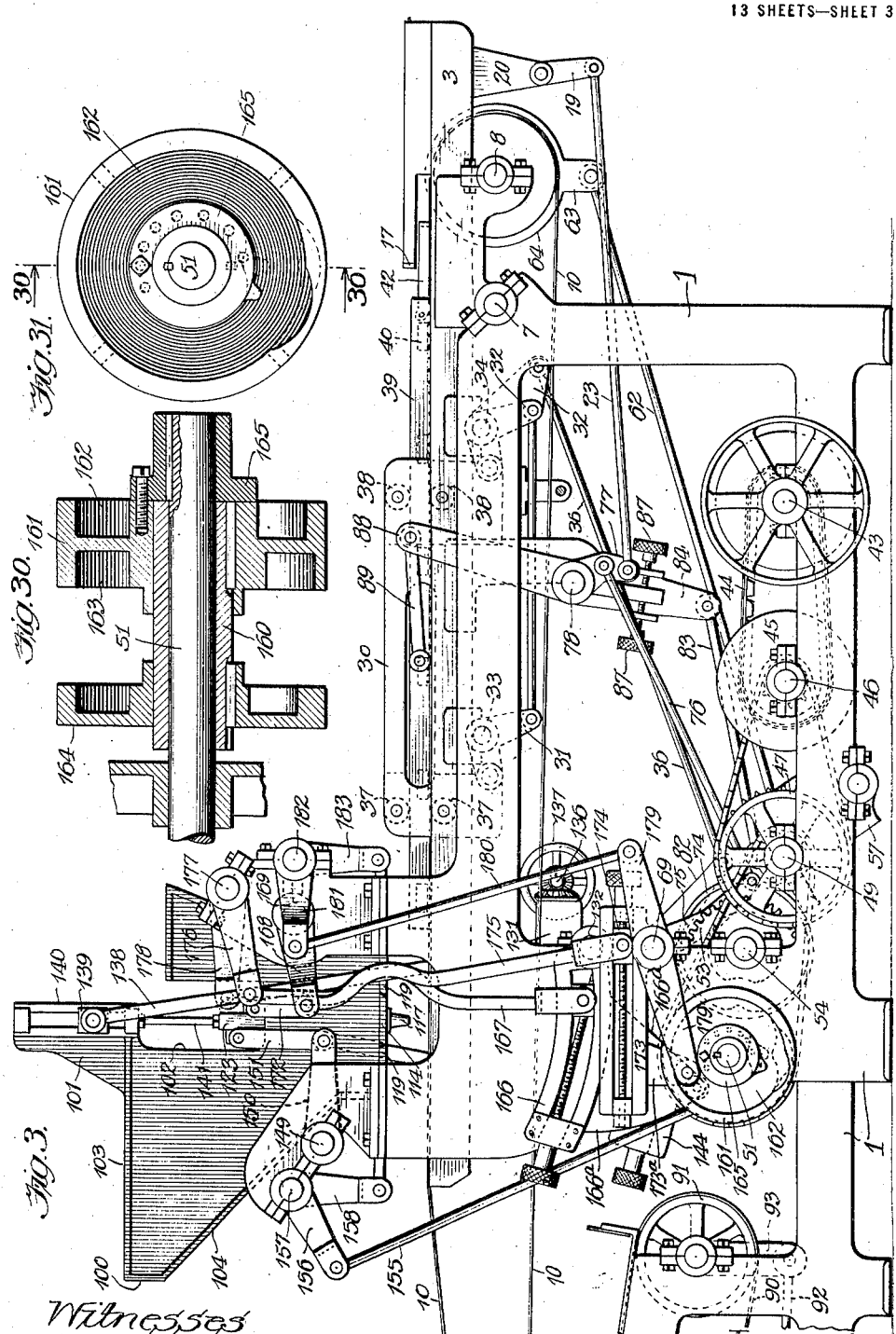

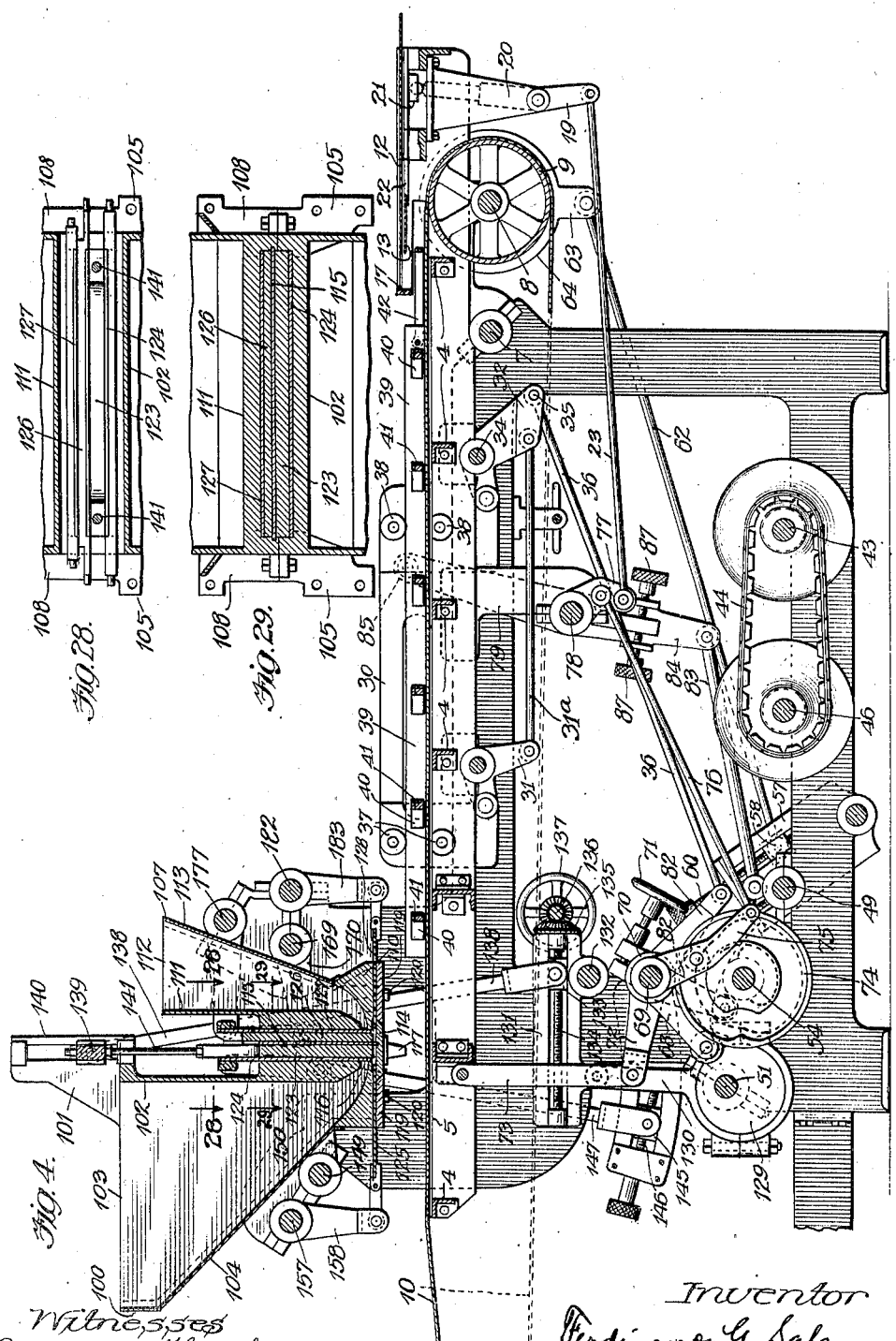

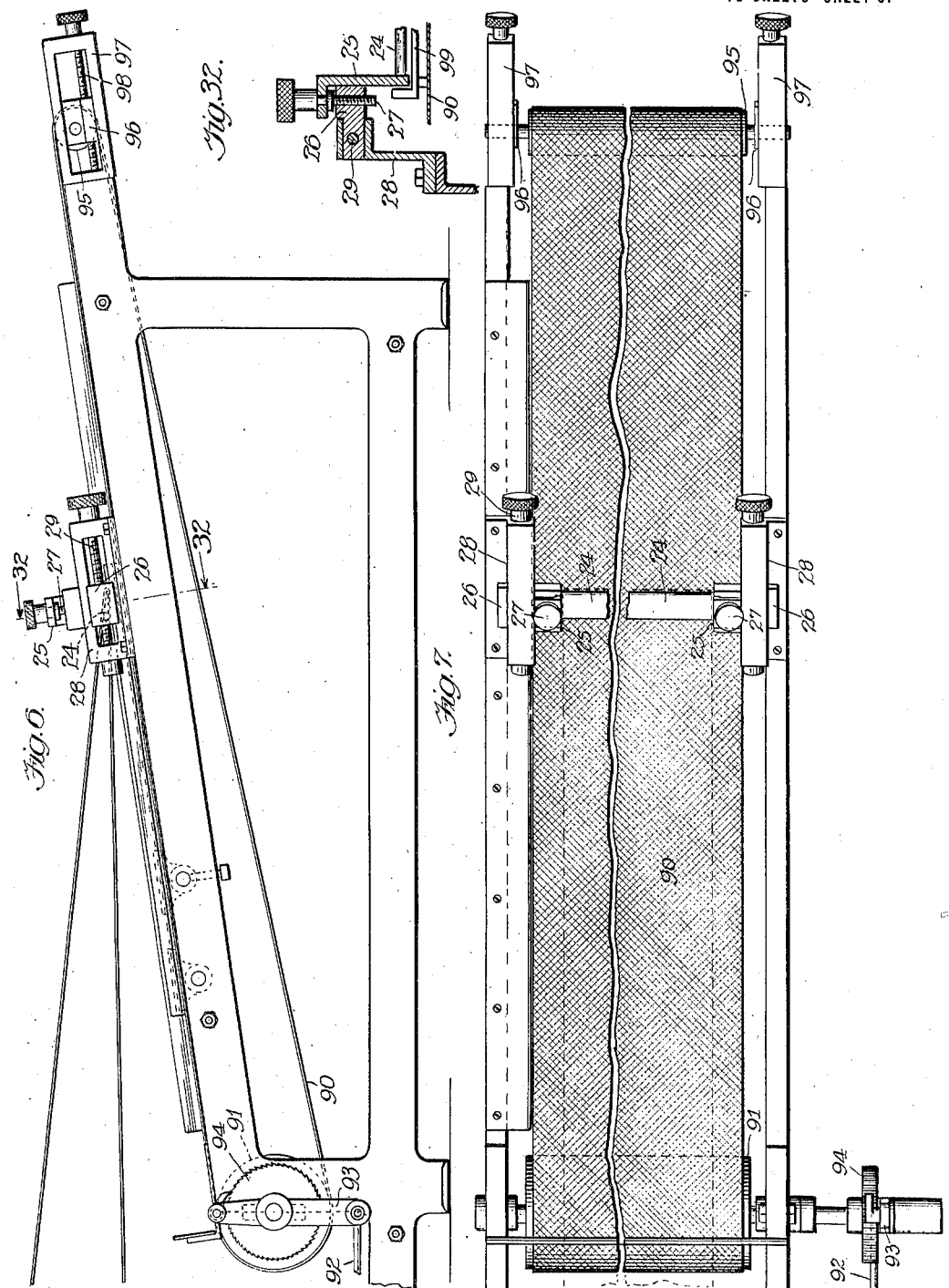

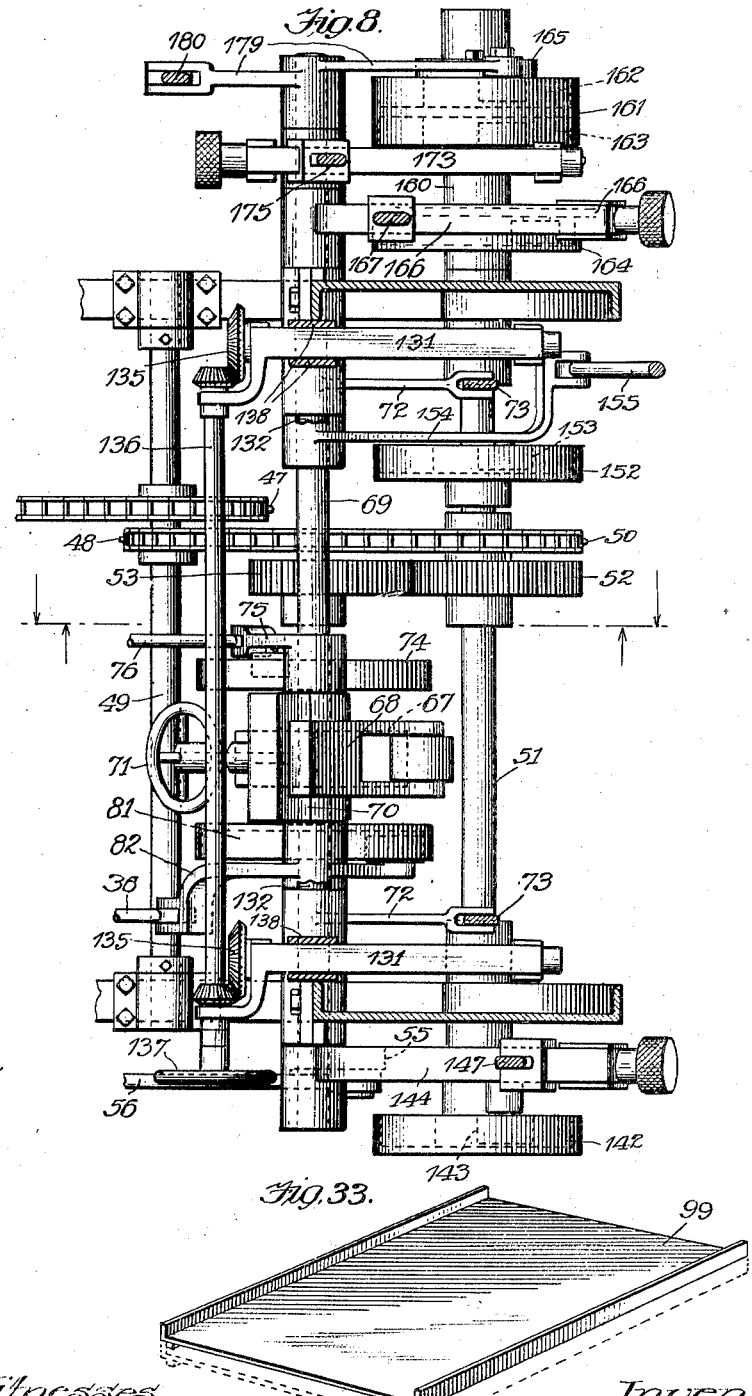

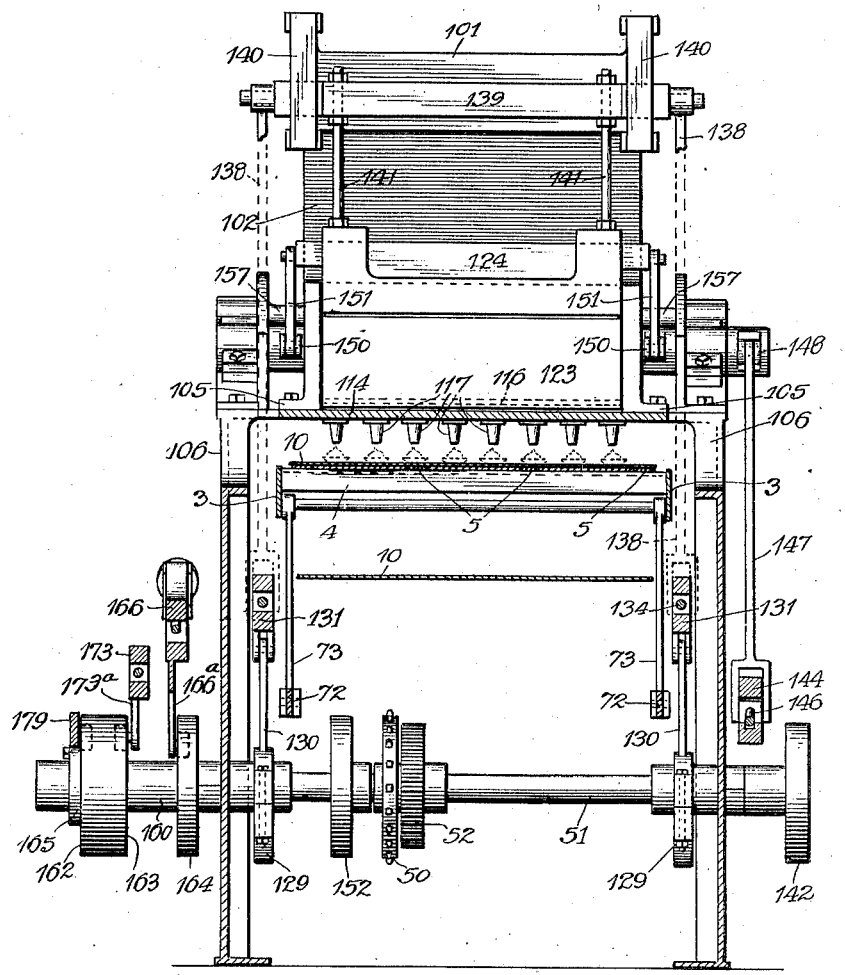

F. G. SALERNO.
MACHINE FOR DEPOSITING CONFECTIONS ON WAFERS, CAKES, AND THE LIKE.
APPLICATION FILED APR. 27, 1914.
1,303,599.
Patented May 13, 1919.
13 SHEETS—SHEET 9.
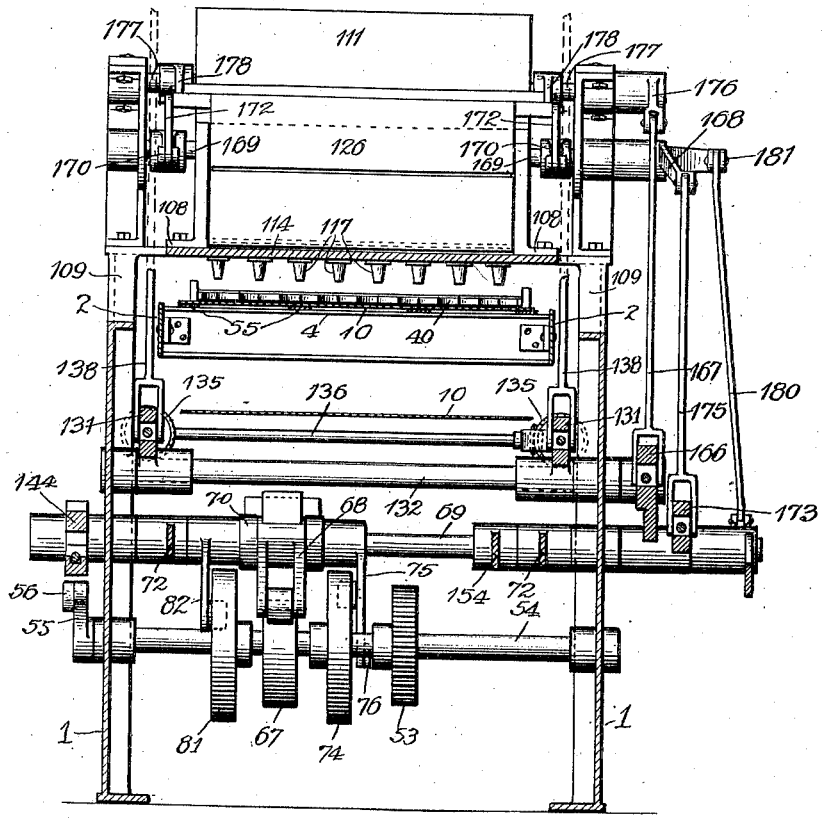
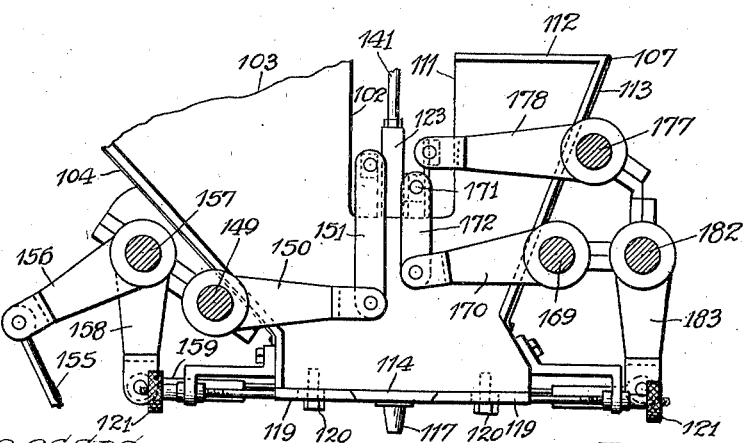

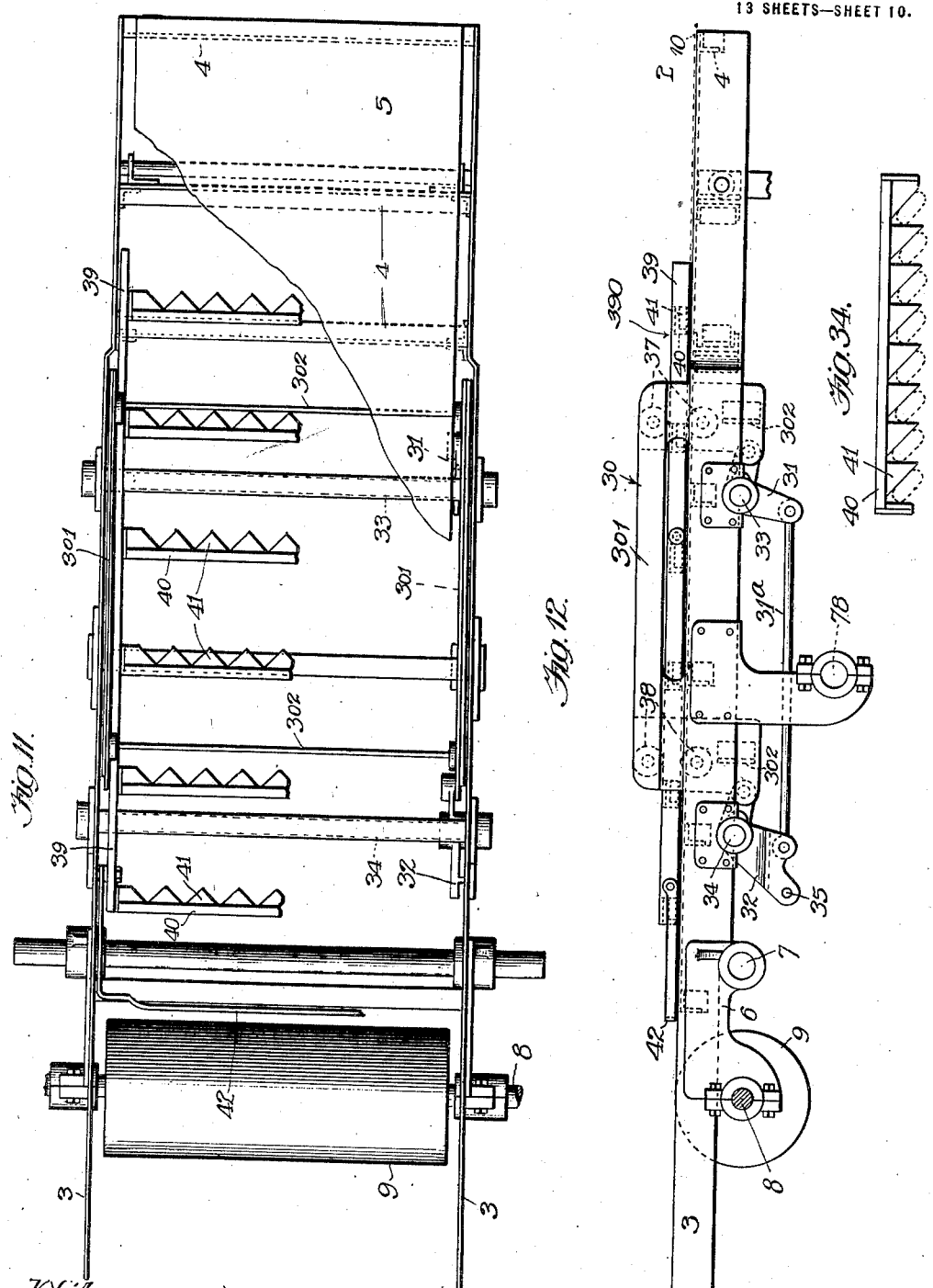

F. G. SALERNO.
MACHINE FOR DEPOSITING CONFECTIONS ON WAFERS, CAKES, AND THE LIKE.
APPLICATION FILED APR. 27, 1914.
1,303,599.
Patented May 13, 1919.
13 SHEETS—SHEET 11.
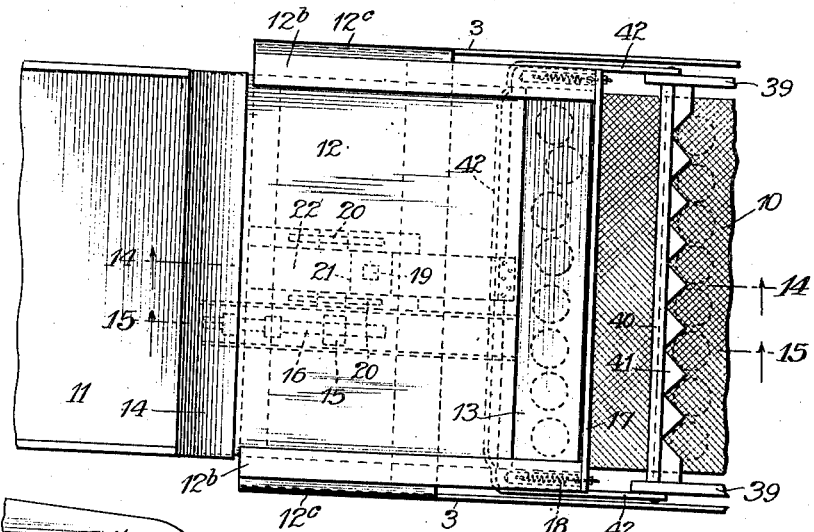
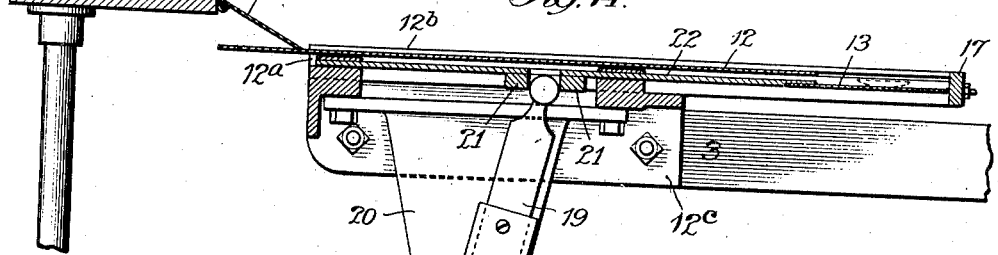
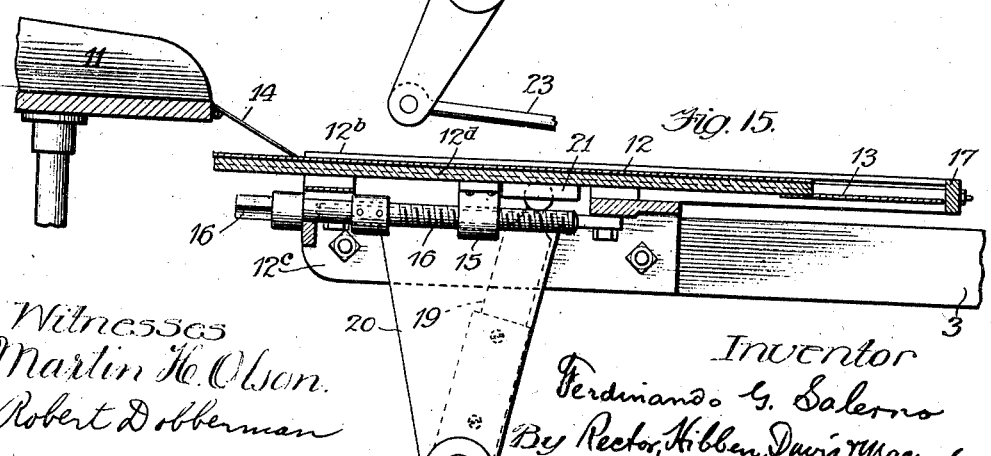

F. G. SALERNO.
MACHINE FOR DEPOSITING CONFECTIONS ON WAFERS, CAKES, AND THE LIKE.
APPLICATION FILED APR. 27, 1914.
1,303,599.
Patented May 13, 1919.
13 SHEETS—SHEET 12.
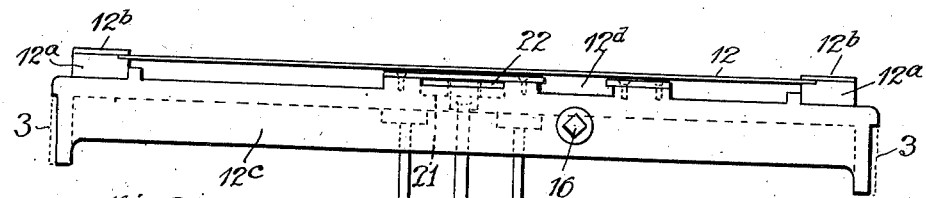
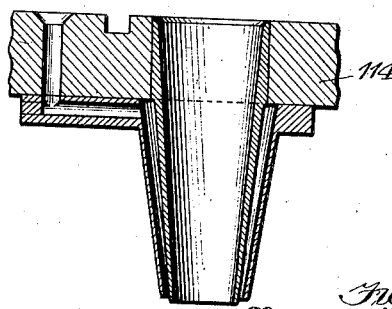
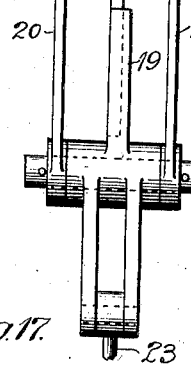
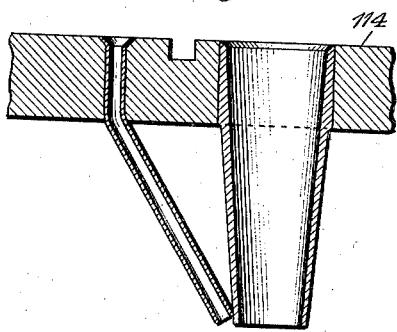
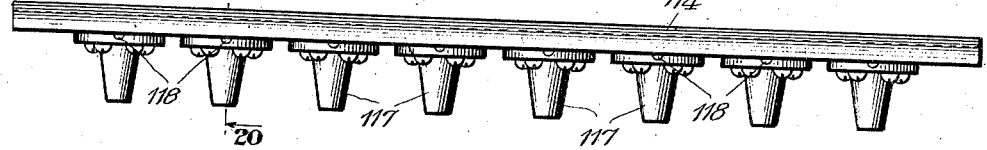
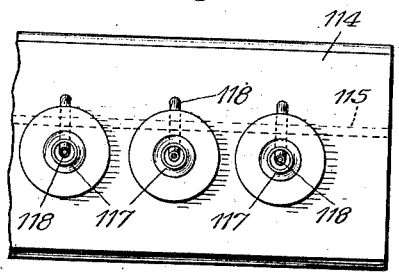
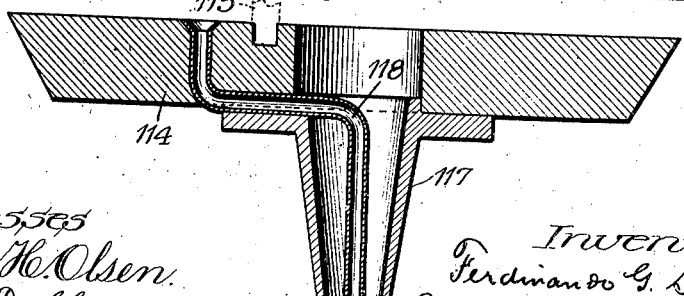

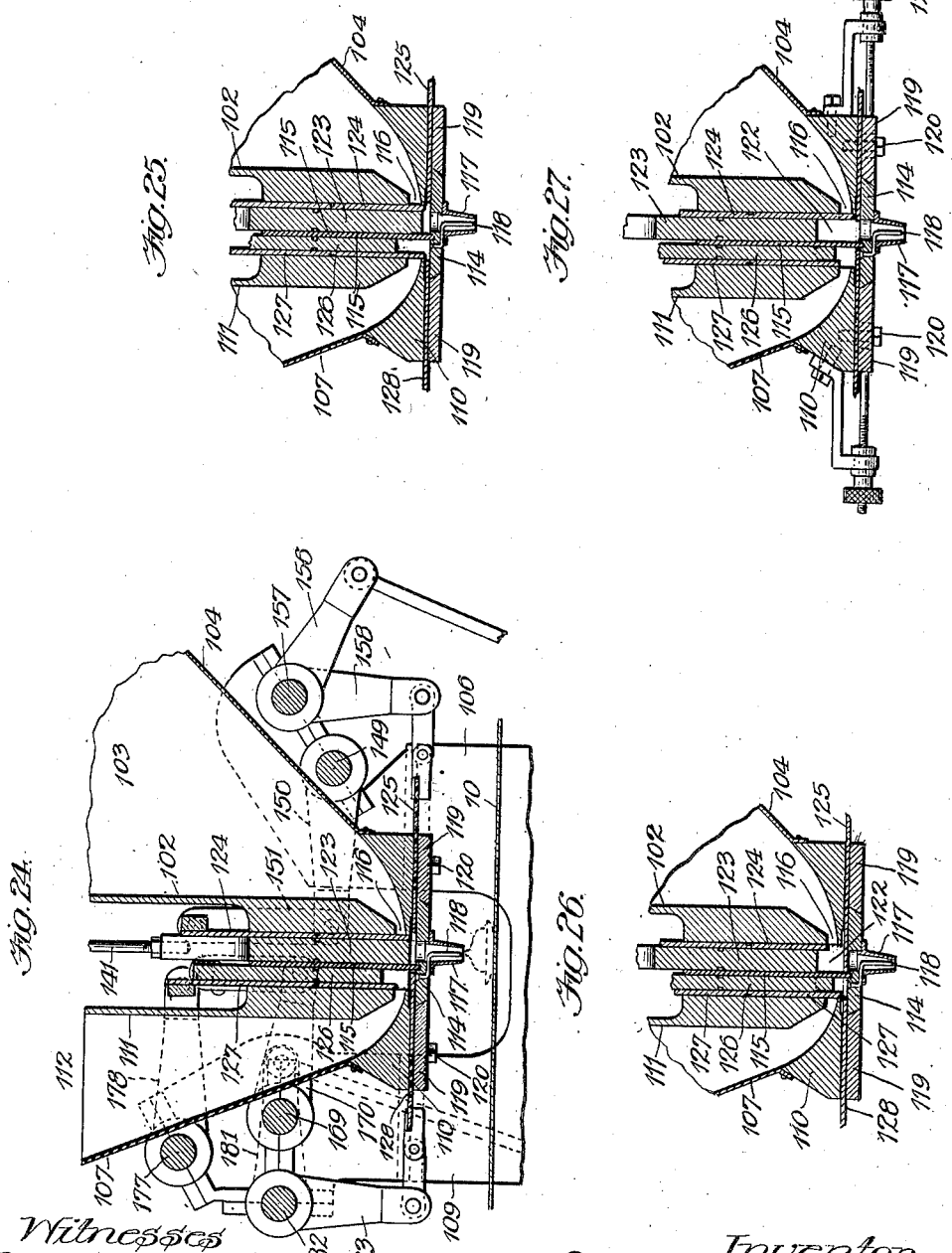

UNITED STATES PATENT OFFICE.

FERDINANDO G. SALERNO, OF CHICAGO, ILLINOIS.

MACHINE FOR DEPOSITING CONFECTIONS ON WAFERS, CAKES, AND THE LIKE.

1,303,599.     Specification of Letters Patent.     Patented May 13, 1919.

Application filed April 27, 1914. Serial No. 834,780.

*To all whom it may concern:*

Be it known that I, FERDINANDO G. SALERNO, a citizen of the United States, residing at Chicago, in the county of Cook and State of Illinois, have invented certain new and useful Improvements in Machines for Depositing Confections on Wafers, Cakes, and the like, of which the following is a specification.

My invention relates to machines for automatically depositing portions or small quantities of plastic or semi-liquid confections, usually as a top coating upon previously-formed small cakes or wafers and the like which are fed through the machine, although the portions may be deposited directly upon trays or containers and themselves form the cakes or wafers produced by the operation of the machine. In the latter case the mechanism for feeding the previously formed cakes through the machine is dispensed with. The products mentioned are known in the trade as "deposit goods," and the object of my invention is the production of a strong, practical and efficient machine of this character suitable for the commercial production of such deposit goods in quantities and on a large scale. With this object in view my invention consists in the general organization of the machine, the association of different groups of mechanisms and different combinations of elements and various details of construction which are fully and at length described in the following specification, and the essential elements of which are recited in the appended claims.

In the drawings, Figure 1 is a right side elevation of the rear portion of the machine; Fig. 2 is a central vertical section of the same part of the machine, looking from right to left; Fig. 3 is a left side elevation of the same part of the machine shown in the preceding figures; Fig. 4 is a central vertical section of the same, looking from left to right; Fig. 5 is a top plan view of the same portion of the machine; Fig. 6 is a right side elevation of the front end of the machine; Fig. 7 a top plan view of the same; Fig. 8 is a top view on an enlarged scale of parts lying near the center of the machine below the plane of the dotted line 8—8 of Fig. 1; Fig. 9 is a sectional view taken on the line 9—9 of Fig. 1, looking toward the front of the machine, as indicated by the arrow; Fig. 10 is a sectional view taken on the line 10—10 of Fig. 1, looking toward the rear of the machine, as indicated; Fig. 11 is a top plan view of the pivoted table over which the feed belt travels, together with a lifting frame and feeding frame carried by such table detached from the framework of the machine; Fig. 12 is a side elevation of the same; Fig. 13 is a top plan view of a distributing table carried by the rear end of the pivoted table shown in Fig. 11; Fig. 14 is a vertical section of the same on the line 14—14 of Fig. 13; Fig. 15 is another vertical section of the same on the line 15—15 of Fig. 13; Fig. 16 is a view of the rear end of the distributing table and a portion of certain operating connections; Fig. 17 is a side view of a nozzle-bar through the nozzles of which the confections are ejected; Fig. 18 is a top view of a fragment of the same; Fig. 19 is a bottom view of a similar fragment; Fig. 20 is a section on an enlarged scale on the line 20—20 of Fig. 17; Figs. 21 and 22 are fragments of similar sections, but showing modified forms of nozzles; Fig. 23 is an elevation of parts of certain connections for operating parts of the depositing mechanism adjacent the bottom of the marshmallow and jelly hoppers, also showing the means by which the nozzle-bar of the depositing mechanism is secured in place; Figs. 24, 25, 26 and 27 sections of such depositing mechanism showing the parts in different positions; Figs. 28 and 29 are fragmental horizontal sections on the lines 28—28 and 29—29, respectively, of Fig. 4; Fig. 30 is a central section of an adjustable sleeve bearing cams for controlling the elements of one depositing mechanism; Fig. 31 is an end view of the structure shown in Fig. 30; Fig. 32 is a vertical section on the line 32—32 of Fig. 6 showing the construction of one of the two opposite brackets and means for adjusting the bar 24; Fig. 33 is a perspective of one of the trays carried by the delivery belt, a second tray being indicated in dotted lines to show the manner in which the trays may be nested or stacked on top of one another; and Fig. 34 is a fragmental detail showing a special form of notching the spacing and positioning bars.

The same letters of reference indicate the same parts in the several figures.

*General organization.*—The general organization and mode of operation of the machine constituting the embodiment of my invention which is illustrated in the drawings and will hereinafter be described may first briefly be outlined as follows: The previously formed cakes are manually fed upon a reciprocating trap or shutter mounted at one end of a pivoted table, and at what for convenience will be termed the rear end of the machine, which shutter automatically drops the wafers, a cross row at a time, upon the top of an endless feed belt. This belt is intermittently rotated by a drum, also mounted in the pivoted table, which belt travels along its central upper reach over the front end of the table, the table being pivoted at its rear end near the rear end of the machine. In the operation of the machine the front end of the table is given a slight intermittent rocking movement upwardly toward the confection-feeding nozzles. The front end of the belt passes around a rounded cross bar secured in fixed position in the frame of the machine. An alining or rectifying feeding frame, consisting of several cross bars provided with V-shaped notches on their front sides, is mounted to slide horizontally in the side members of a lifting frame which has a vertical movement, this lifting frame being itself mounted on the pivoted table abovementioned. By proper connections this lifting frame together with the feeding frame is elevated above the belt, then the feeding frame is moved rearwardly, then the frames are lowered, and the feeding frame moved forwardly to shift the rows of wafers toward a line of nozzles through which the confection is deposited. The forward movement of the feeding frame begins before the belt begins to move forward, and is not finished until after the belt has stopped, and as the frame moves the faster the wafers are moved forward on the belt while it travels. As the wafers are moved forward by the feeding frame, the pivoted table is rocked and the belt and wafers are moved upwardly so that the wafers momentarily come to rest in alinement with the nozzles and in close proximity to them, and at this period the portions of confectionery are deposited.

Below the feed belt, at the forward end of the machine, is arranged a delivery belt which is carried by two drums, one near the center of the machine and the other at its extreme front end. Back of the nose of the feed belt and below it, trays are deposited on the top of the delivery belt which pass under the forward end of the feed belt in close proximity to it, so that the feeding movements of the two belts will result in the finished wafers being automatically delivered by the main feed belt on the trays passing forwardly on the delivery belt.

The depositing mechanism includes two supply tanks or hoppers for the two kinds of confection which the machine now being described is constructed to deposit upon the wafers. Each confection is deposited through a transverse row of nozzles, through which nozzles the confection is intermittently deposited upon the wafers as the latter are brought into alinement and momentarily come to rest under the nozzles, and in the present instances the nozzles of the two series are concentrically arranged, so that both deposits may be made during the same period of rest of the wafers, though under the most usual adjustment of the depositing mechanism the deposits are made successively and not simultaneously. The deposits of confection are produced by the operation of a common piston or plunger for each of the two series, and a valve arrangement for each series which will hereinafter be more particularly described.

A more detailed description of the parts above mentioned and of the operating connections employed to carry out their operation will now be given.

*Wafer-feeding mechanism.*—The frame of the machine, designated generally by the reference numeral 1, may be of any appropriate and desired construction of suitable proportions and sufficient strength, and so framed as to afford proper support to the various movable elements. The pivoted table 2 (see Figs. 11 and 12) comprises side members 3 and cross members 4, which latter may suitably be formed of flanged metal and a flat top sheet or plate 5 affording a smooth bearing for the under side of the feed belt.

Secured to the table 2 near its rear end, are a pair of opposite brackets 6, formed with hub bearings journaled upon a cross rod 7 of the frame 1, (Figs. 1, 2 and 12). These brackets are also formed with bearings to receive the shaft 8 of the drum 9 through which the feed belt 10 is intermittently moved, by connections which will later be described. At its front end the feed belt passes around a cross bar 24 having a rounded front edge, which bar is adjustably mounted upon the framework of the machine (Figs. 6, 7 and 32.) To this end (see Fig. 32) the bar is secured at its ends to slides 25 mounted to slide vertically in blocks 26 through the reaction of screws 27 threaded in said blocks and rotatably connected with the slides. The blocks 26 are mounted to be slid lengthwise of the belt in slide brackets 28 fixed to the frame 1 of the machine by means of screws 29 threaded in such blocks and rotatably mounted in such slide brackets.

At the rear of the pivoted table 2 and slightly above it is arranged in fixed position a supply tray 11 for the wafers to be coated, (see Figs. 13, 14 and 15;) and upon the rear end of the pivoted table is a distributing table 12 for the use of operators (or a couple of operators—one on each side of the machine) in arranging a row of the proper number of wafers upon a trap slide 13 slidingly mounted immediately below and in front of such distributing table, and which lies a short distance above the top of the belt. An apron 14, pivoted on the tray 11 and resting on top of the table 12 is provided to accommodate the slight rocking movement due to the oscillation of the pivoted frame 2 and parts carried by it.

In order to provide for the convenient feeding of wafers of different sizes, the table 12 is provided with a sliding adjustment whereby the exposed portion of the slide can be given different widths, and to this end (see Figs. 15 and 16) it is slidingly mounted at its opposite edges in ways formed by strips 12$^a$, 12$^b$, secured to opposite sides of a frame 12$^c$ which is seated between and secured to the rear ends of the side plate 3 of the pivoted table 2. Secured to the under side of the table 12 is a slide-bar 12$^d$ confined in guideways formed in the frame 12$^c$, and this slide bar carries upon its under side a follower block 15 having screw-threaded engagement with a screw-rod 16 rotatably journaled in bearings carried by the table 2.

The slide 13 in its forward movement abuts against a rail 17 which preferably, and as shown, (see Fig. 13) is yieldingly connected by springs 18 with the distributing table in order to avoid injury to the operator's fingers in case they should accidentally be caught by the forward movement of the slide. The reciprocation of the slide to intermittently drop rows of wafers upon the feed belt is effected through the oscillation of a rocking lever 19 intermediately pivoted in a bearing bracket 20 secured to the table 2, the rounded upper end of the lever playing between lugs 21 formed upon a bar 22 which is secured to and extends rearwardly from the slide, the lower end of such lever being operated by a link 23 through connections hereinafter described.

Forwardly of the distributing table and slide just described, is arranged a lifting frame 30, (see Figs. 11 and 12,) said frame comprising side plates 301, and cross bars 302, and being supported upon the front arms of a front pair of bell crank levers 31, and a rear pair 32, intermediately keyed to the rock shafts 33 and 34 respectively, such rock shafts being journaled at their ends in bearing brackets fixed to the pivoted table 2. The lower arms of the front pair of levers 31 are pivotally connected by links 31$^a$ to the lower arms of the rear pair of levers 32, and such last-mentioned lower arms are connected by a cross rod 35 so that the bell cranks and shafts may be rocked in unison by means of a link 36 pivotally connected to the cross rod 35, through connections hereinafter described, to raise and lower the frame 30.

Each of the side plates 30 of the lifting frame carries upon its inner face a front pair of rollers 37 and a rear pair of rollers 38, the top rollers and bottom rollers on the two side plates engaging the top and bottom surfaces of the side members 39 of a reciprocating feeding or wafer-spacing frame 390 comprising such side members and cross bars 40 spacing the side members apart and securing them together. Secured to this feeding frame are a number of notched spacing and positioning bars 41, which may conveniently, as in the present instance, be secured to the cross bars 40. These bars are made removable in order to permit the interchange of bars having notches of different size and thus permit the adjustment of the machine to wafers of different sizes.

In the present instances the notches are V-shaped and their sides form an angle of about ninety degrees, this shape being adapted to position either round or square wafers; but different shaped notches may be used for wafers of other shapes, such as those shown in Fig. 34, which are particularly adapted for elongated oval wafers or cakes. At the rear end of the feeding frame are pivoted the side members of a bail 42, the cross member of which extends rearwardly and rests upon the surface of the feed belt. In the rearmost position of the feeding frame the bail lies back of the trap slide 13, while in forward position it lies in front of such slide.

*Operating connections for wafer-feeding mechanism.*—The connections through which the parts thus far described are operated are as follows: The power shaft 43 of the electric motor which in the machine being described is used to drive the movable elements is connected (see Fig. 2) through a change-speed belt 44—the particular construction of which need not be described,—with sprocket and reducing chain gearing 45 on cross shaft 46; similar reducing gears 47 and 48 on shaft 49, and the sprocket wheel 50 on a rotating cam shaft 51. An elliptical gear wheel 52 is secured to the shaft 51, which gear meshes with an elliptical gear wheel 53 on a second rotating cam shaft 54, producing a periodic variation of speed in the rotation of the latter shaft. This variation of speed is important in producing a quick movement of certain parts operated through the shaft 54, and a slow or prolonged movement of the other parts, in their cycles of movement.

The connections through which the feed belt 10 is intermittently advanced (see Fig. 1) comprise a crank arm 55 fast upon the shaft 54 at the right side of the machine and connected pivotally by a pitman rod 56 with a rocking lever in the form of a frame 57 which is pivoted on a lower side member of the frame 1 of the machine. This frame is formed with ways in which are slidingly mounted pivot blocks 58 and 59, adjusted by screw rods 60 and 61, respectively. The block 59 provides for the movement of the delivery belt as will be hereinafter described. The block 58 is pivotally connected to the link 62, which is pivoted at its other end to a short arm 63 depending from the periphery of a pawl casing 64 which is loosely mounted on the drum shaft 8. A pawl, or a series of pawls 65, in the present instance four in number, are pivotally mounted near the periphery of the casing and are pressed by springs into contact with a ratchet wheel 66 disposed within the pawl casing and keyed to the shaft 8. It is obvious that the rotation of the crank arm 55 on the shaft 54 will rock the frame 57 and through the link 62 and pawl and ratchet connection intermittently advance the belt 10.

The connections through which the front end of the pivoted table, and consequently the feed belt, is raised into proximity with the feeding nozzles comprises a cam 67 fixed to the rotating shaft 54 (see Figs. 4, 10 and 8) and having its peripheral cam surface arranged to act against a roller carried by the end of an arm 68, the hub of which—in order to provide for adjustment,—is loosely mounted on a rock shaft 69 journaled in bearings fixed to the frame 1 of the machine at opposite sides thereof. Adjacent the hub of the arm 68 a block 70 is secured to the rock shaft 69, this block being equipped with an adjusting hand wheel and screw 71 threaded through a lug on said block and bearing against a lug on the hub of the arm 68. The rock shaft 69 has rigidly secured to it under the opposite sides of the pivoted table 2, a pair of rock arms 72, the ends of which are pivoted to links 73 which at their upper ends are pivoted to the table 2 near its front end. Manifestly the adjustment of the screw 71 will vary the angular relation of the arm 68 and the members rigidly secured to the rock shaft 69 positively in one direction—the parts being yieldingly maintained in coöperative relation in the opposite direction by gravity—and a connection by which the rotation of the cam 67 will rock the pivoted table to any desired extent within its limit of adjustment is thus provided.

The trap slide 13 mounted upon the rear end of the table 2 is reciprocated through a cam plate 74 keyed to the rotating shaft 54 near the center line of the machine (see Figs. 10, 4 and 3), such plate having one of its side faces formed with a cam groove to engage a roller intermediately mounted upon a lever 75 and the lever having its upper end pivotally mounted upon the rock shaft 69 before mentioned. The lower end of said lever is pivoted to one end of a link 76, the other end of it being pivoted to an oscillating lever 77 intermediate its ends. The upper end of this lever is loosely pivoted upon a cross-rock-shaft 78 journaled in the lower end of brackets 79 fixed upon the side members of the pivoted table 2. The lower end of the lever 77 is pivotally connected by the link 23 with the rocking lever 19 hereinbefore mentioned (see Figs. 14 and 16), pivoted in the bearing bracket 20 at the rear end of the table 2. The outline of the cam slot and arrangement of the cam on the variable motion shaft 54, and the adjustment of parts is such as to produce, through the connection described, a quick reciprocation of the slide 13 at proper intervals, such slide remaining in forward position the rest of the time.

The lifting frame 30, carried by the pivoted table 2 and in which is mounted the feeding or wafer-spacing frame, is raised and lowered through the action of a cam plate 81 fixed to the rotating shaft 54 before mentioned, such plate having formed in one of its side faces a cam groove arranged to coöperate with a roller mounted on one arm of a bell crank lever 82 loosely pivoted on the rock shaft 69 (see Figs. 10, 8 and 4). The other arm of the bell crank is pivoted to the link 36, which, as hereinbefore stated, is pivoted to a cross rod 35 connecting the lower arms of the levers 32, so that the action of the cam and roller connection will cause the lifting frame 30 to be alternately elevated and depressed. The contour of the cam slot and arrangement of the cam on the shaft 54 is such that the frame will be quickly raised to uppermost position and maintained there during nearly a half revolution of the cam, and quickly lowered and maintained in lowermost position for approximately an equal period of time.

The feeding, or spacing and positioning frame 390 is reciprocated in the frame 30 by the rocking of the frame 57, which it will be remembered is rocked by a pitman connected to crank arm 55 fast upon the rotating shaft 54 at the right side of the machine (see Fig. 1). A connecting rod 83 is pivoted to the top of the frame 57 and also to the lower end of a jointed rocking lever comprising a lower arm 84 and an upper arm 85 (Figs. 1, 3 and 4), the arm 85 being keyed to the rock-shaft 78 which has before been mentioned, while the arm 84 is capable of rotary adjustment with respect thereto. To effect this adjustment the member 85 has a depending extension lying adjacent the arm 84, such extension being perforated for the reception of cross bolt 86, while the arm 84 is provided with a registering slot through which the bolt passes. To facilitate adjustment and add strength to the connections, a pair of opposite adjusting screws 87, 87 are threaded in bosses upon the arm 84 opposite the bolt 86. On the opposite, or left-hand side of the table, a rock arm 88 similar to the upper portion of the arm 85, is keyed to the rock shaft 78 and a pair of links 89, 89, pivoted rearwardly to the rock arms 85 and 88 and at their front ends pivoted to the side members 39 of the feeding frame serves to complete the train of mechanism by which the reciprocation of the rocking frame 57 communicates reciprocating sliding motion to the frame 390. The combined action of the mechanism which raises and lowers the lifting frame 30, and the mechanism which reciprocates the feeding frame 390 has the effect of quickly lifting the latter frame from its position in close proximity to the feed belt when it is in forward position, then carrying it rearwardly in elevated position; then quickly dropping it upon the belt, and then sliding it forward while in lowermost position to its forward position again. However, since the bail 42 is pivoted at its ends to the rear end of the feeding frame, the cross portion of such bail will not be lifted, but will slide back and forth under the trap slide 13; and the arrangement and timing of the parts is such that a row of wafers being dropped by the trap as soon as the bail has passed to rearward position the bail will act to withdraw such row into position to be engaged by the nearest notched bar at the succeeding reciprocation. The provision of a plurality of notched positioning bars has the advantage of causing accurate alinement of the wafers by the time the last bar is reached, and enables the operators to exchange broken or defective wafers, or rectify any irregularity of operation that may occur.

*Delivery belt and operating connections.*—Before proceeding to describe the mechanism for depositing the confections on the wafers, a description of the delivery belt will be given. This belt, indicated by the reference numeral 90, (Figs. 1, 6 and 7) runs over a feed drum 91 at its rear and lower end, such drum being operated to intermittently move the upper stretch of the belt forwardly by a pawl and ratchet connection somewhat similar to that by which the drum 9 is operated. To effect this movement the adjustable block 59, mounted in the rocking frame 57 before mentioned, (see Fig. 1) is pivotally connected by the link 92 with a lever 93 equipped with a pawl which engages a ratchet wheel 94 keyed to the shaft of the drum 90. The opposite end of the belt, Figs. 6 and 7, runs over a drum 95 journaled in bearings formed in bearing blocks 96 which are slidably mounted in ways formed in plates 97 secured to the frame 1 at opposite sides of the machine, the blocks being each provided with a screw-threaded bore engaged by an adjusting screw 98 for the purpose of enabling the belt to be adjusted to proper tension.

It will be understood that trays 99 (preferably formed with side rails but without rails at their ends and having bottom ribs so located that the trays may be stacked securely—(see Fig. 33; also Fig. 6,) are supplied on top of the delivery belt in a continuous row back of the line where the feed belt passes around the rounded bar 24, the trays being removed and stacked as desired after they are filled.

Through the adjustability of the connections for moving the feed and delivery belts, a variation of their movements may be produced. In the case of small wafers the two belts may be adjusted to move a short distance practically in unison. With larger wafers it is desirable to so adjust the connections that the feed belt will move to first carry the row of wafers forward to rest partially on the delivery belt, or the tray thereupon, and the delivery belt then act to effect a further advance.

*Depositing mechanism.*—The machine illustrated and herein described is adapted to make deposits of two different confections, as for instance marshmallow paste and jelly, and in the present instance the two supply receptacles or hoppers and parts respectively associated with them are of different capacities, the group of parts of larger capacity being for convenience of description termed marshmallow parts, and those of smaller capacity jelly parts. The marshmallow hopper 100 may, as in the present instance, (see Figs. 1, 2, 3, 4, and 9) be conveniently formed of an irregular casting 101 which comprises a transverse back wall 102 and triangular side walls 103 and a sheet metal plate 104 which is secured to the front edges of the side walls to form a front wall. This casting is formed with side flanges 105 at its base by means of which it is bolted to upwardly extending brackets or extensions 106 of the opposite side members of the frame 1 of the machine. The jelly hopper 107 is similarly bolted through flanges 108 upon opposite extensions 109 lying at the rear of the extensions 105, and is likewise formed of an irregular but smaller casting having a transverse front wall 111 and side walls 112, and a plate of sheet metal 113 secured to such side wall to form the rear wall of the hopper. The castings 101 and 110 meet along the lower part of their side walls to form a tight joint, but the proximate transverse walls are offset at this lower portion to leave between the castings a rectangular space extending transversely of the machine and forming a housing for rectangular plungers and valves for depositing the confections, hereinafter described; and the side walls and proximate transverse walls are offset away from each other above the plane of the housing space to leave an opening for the accommodation of operating connections for such plungers and valves, see Figs. 2, 4, 28 and 29.

The bottom of the housing space is closed by a removable nozzle-bar 114 extending transversely of the machine, and is divided by a partition 115 seated in grooves formed in the opposite walls of such chamber and a groove formed in the top of the nozzle-bar to form two chambers, a marshmallow forcing chamber and a jelly forcing chamber. The nozzle-bar is equipped on its under side with a series of outer nozzles 117 communicating with the marshmallow forcing chamber, and a concentric series of inner nozzles 118 communicating with the jelly forcing chamber. These nozzles correspond in number and spacing with the notches of the positioning bars of the feeding frame 390, it being understood that in order to fit the machine to operate on different sizes of wafers, the machine is adapted to be fitted with interchangeable positioning bars and corresponding interchangeable nozzle bars varying in spacing, and the throw of the feeding frame is made adjustable.

The nozzle-bar 114, which extends across the bottom of the castings 101 and 110 and at its ends seats tightly against them is secured in position by the wedging action of a pair of bars 119, 119 lying on each side of it, see Figs. 3, 4 and 23. These bars are held by bolts 120 passing through slots adjacent their opposite ends and threaded in the bottom of the side walls of the marshmallow and jelly hopper castings in contact with the lower faces of such side walls, Fig. 23. When the bolts 120 are sufficiently loosened the bars 119 may be shifted by screws 121 rotatably mounted in brackets secured to the hopper casting but secured by collars against endwise movement, such screws having threaded engagement with screw rods fixed in the ends of the bars, and the nozzle-bar may be withdrawn. The nozzle-bar being replaced, or a change of nozzle bars made, the screws 121 are operated to adjust and secure the nozzle-bar in place, and the bolts 120 tightened for complete security.

The forcing mechanism by which the marshmallow paste is forced through the nozzles 117 may now be described, reference being had to Figs 2 and 4, and more particularly to details shown in Figs. 24, 25, 26, 27, 28 and 29. The marshmallow forcing chamber 122 is closed at its top by two vertically reciprocating plates, the larger one constituting a plunger 123, and the other a supply valve 124 for governing the port 116. A third plate, constituting a shut-off valve 125, is arranged to reciprocate horizontally in a slideway formed in the casting 101, the bottom of this valve being disposed in the plane of the top of the nozzle-bar 114. By connections which will shortly be described, the piston or plunger 123 is caused to descend gradually or slowly from its uppermost position, the valve 124 being at the time depressed to close the port 116, and the shut-off valve 125 being in outer position, to force the marshmallow paste through the row of nozzles 117, until the plunger reaches lowermost position. See Fig. 24.

Immediately after the end of a down stroke of the plunger 123, the initial upward movement of such plunger sucks back the marshmallow into the nozzles 117, (Fig. 25) the supply valve 124 momentarily remaining closed and the shut-off valve 125 open, this action, in connection with the dropping of the pivoted table and consequently the belt and wafers, which occurs at the same instant of time, breaking the stream and preventing dropping of the confection. The shut-off valve 125 then shifts quickly to inner, or closed position while the supply valve is rising and just as it is uncovering the supply port 116, (see Fig. 26), and the continued upward movement of the plunger 123 and supply valve 124 draws the marshmallow into the forcing chamber until such plunger has reached its upper position, see Fig. 26. The shut-off valve is quickly shifted to outer position in advance of the downward, forcing stroke of the plunger 123, and the supply valve 124, which descends in advance of the plunger, having been meanwhile returned to lower position to close the valve 116, (see Fig. 27), the forcing action is repeated the parts remaining in the position described until the end of the forcing stroke, see Fig. 24.

The forcing mechanism for depositing the jelly through the jelly nozzles 118 (see the same figures of the drawings) includes a plunger 126, a supply valve 127 and a shut-off valve 128 which correspond in function to similar parts of the marshmallow mechanism just described, and the sequence of action of the parts is substantially the same. However, inasmuch as a much smaller quantity of jelly is ordinarily deposited than of the marshmallow paste, the reciprocation of the jelly plunger and valves is more quickly made and the parts remain periodically inactive with the forcing chamber filled and ready to be ejected. The outline of the cams which govern the action of the parts is therefore different from corresponding cams which govern the movements of the marshmallow mechanism, and the operation connections are different. These connections will now be described.

*Connections for operating depositing mechanism.*—The connections for operating the marshmallow plunger, Figs. 2, 4, 8, and 9, include a pair of eccentrics 129 keyed just inside the side members of the frame 1 to the rotating shaft 51, which it will be remembered is continuously driven through connections with the power shaft hereinbefore described. The connecting rods 130 reciprocated by the eccentrics are at their top ends pivoted to a pair of opposite adjusting frames 131 which are journaled upon a fixed cross shaft 132 secured at its opposite ends to the sides of the frame 1. Each frame is formed with a slideway to receive a sliding pivot block 133 (Figs. 2 and 4,) which block is provided with a threaded bore engaging a screw rod 134 secured by a collar at one end and by the hub of a bevel pinion 135 at the other end against lengthwise movement.

The end of each frame adjacent its bevel pinion is formed with an off-set extension which has formed in it a journal bearing (see Fig. 8,) and in the two bearings rotates a shaft 136 to which are keyed opposite bevel pinions meshing with the pinions 135. One end of the shaft is provided with a hand wheel 137 by which it may be rotated, to shift the two pivot blocks 133 and thus simultaneously vary their position in the frames 131 and consequently the extent of movement which they impart to other parts jointly operated by them. By this means a longer or shorter stroke may be given the marshmallow plunger 123, and the amount of confection deposited thereby may be varied. To each pivot block is pivoted a connecting rod 138, the two rods being pivoted at their top ends to the opposite ends of a cross bar 139 mounted to slide in vertical slideways formed in a pair of brackets 140 secured to the tops of the opposite side walls 103 of the marshmallow hopper and lying directly above the marshmallow plunger, Figs. 2, 4 and 9. A pair of rods 141 screwed into the top of such plunger at its opposite ends and at their top ends bolted to the cross bar 139 serve to complete the connection through which the plunger is operated.

The supply valve 124 of the marshmallow depositing mechanism is operated through a cam disk 142 keyed to the rotating shaft 51, said disk being secured to the outer right end of said shaft and being formed with a cam groove on its inner face formed to receive a laterally projecting roller 143 pivoted to a depending extension upon an adjusting frame 144 which constitutes a rocking lever, Figs. 1, 8 and 9. This rocking frame is loosely pivoted upon the rock shaft 69, before mentioned and is formed with a curved slideway (concentric with the pivotal point of a connecting rod connected to the frame,) in which is arranged a curved follower block 145 carrying a transverse cylindrical block which is provided with trunnions at its ends and also with a threaded cross bore engaged by a screw rod 146, said screw rod being rotatable but not longitudinally movable in the end of said frame. A connecting rod 147 is pivoted at its lower end to said trunnions and at its upper end to an arm 148 fast upon a rock shaft 149 which is journaled in bearings on opposite sides of the frame 1. This rock shaft has fixed to it, slightly outside the planes of the ends of the plunger and valve housing, two rock arms 150 which are pivoted to the lower ends of two links 151 which at their upper ends are pivoted to trunnions fast upon and extending laterally or outwardly from the top part of the marshmallow supply valve 124, Figs. 1, 23 and 24. The shape of the cam slot in the disk 142 is such as to elevate the valve 124 quickly, maintain it in elevated position for a time, then lower it quickly and maintain it in lowered position for the remainder of the period of revolution.

The shut-off valve 125 of the marshmallow depositing mechanism is reciprocated through a cam disk 152 fixed to the shaft 51 between the center and the left side of the machine, and having a side cam engaging a roller 153 pivoted between the ends of a rocking lever 154 which at one end is pivoted upon the rock shaft 69 and at the other end to a link 155, Figs. 2 and 8, such link being pivoted at its upper end to a rock arm 156 fixed to a cross shaft 157 which is journaled at its ends in the frame of the machine, (see Figs. 2, 3, 23 and 24.) This shaft has fixed upon it a pair of rock arms 158 which are pivoted at their lower ends to blocks 159 pivoted to the outer edges of the shut-off valve 125, there being sufficient play in such pivotal connection to permit linear movement of the shut-off valve. The cam slot in the disk 152 is so formed as to produce quick opening and closing movements at the proper times.

It is evident that in order to effect the depositing of either confection the cycle of operation of the parts concerned must remain unchanged, but the two depositing mechanisms may be timed to operate simultaneously or successively within limits determined by the structure, and the arrangement of the mechanism for placing the wafers in alinement with the nozzles and removing them therefrom. Indeed, if the machine be used—without employing the feeding mechanism—to form cakes or lozenges of confectionery by depositing the confection directly on a suitable non-adhesive surface, as waxed paper, greased pans or the like, any desired timing of the deposits may be made. This capacity for adjustment is important commercially, in order that a variety of goods may be made. Thus, it may be desired to deposit a drop of colored jelly on top of a white marshmallow paste or icing, or to cover up a colored deposit with a white paste, or deposit two confections simultaneously and evenly so that the outer will form an annular ring around the inner, all of which may be accomplished by adjusting the operation of the two depositing mechanisms with respect to each other. To enable this to be readily accomplished I have mounted the controlling elements for one set of parts, in the present machine the jelly mechanism, upon a single element which is capable of adjustment to simultaneously adjust the separate connections for the jelly plunger 126, the jelly supply valve 127 and the jelly shut-off valve 128.

This single or common element consists of a sleeve 160 rotatably adjustable upon the outer portion of the shaft 51 at the left side of the machine, to which sleeve are keyed a double cam disk 161 having on its opposite side faces two cam slots 162 and 163 and a single cam disk 164 formed with a single cam slot on one of its side faces (Figs. 8, 9, 30 and 31). Adjacent the cam disk 161 and keyed upon the outer end of said shaft is a disk 165 arranged to be bolted to the central part of the double cam disk 161 in various positions of angularity so that the shaft and cam disks may be caused to rotate together. This angular adjustment in the present instance is attained by forming the disk 165 with a hole through which passes a bolt arranged to be screwed into any one of a series of threaded sockets formed in the cam disk 161.

The movements of the jelly plunger 126 are controlled through the cam slot 163 in the double cam disk 161. This cam slot engages a roller carried by a depending extension 173ª formed on a rocking adjusting frame or lever 173 which is pivoted upon the rock shaft 69 hereinafter described (see Figs. 3 and 8). This frame is provided with a slideway in which travels a follower block 174 provided with trunnions and having a threaded bore engaged by a manually operable screw secured against longitudinal movement, for adjusting purposes. Pivoted upon the block is a connecting rod 175 which rocks a crank arm 168 fast upon the projecting outer end of a rock shaft 169 which is journaled in brackets secured to the side members of the frame, and upon this rock shaft are secured a pair of rock arms 170 extending just outside the side walls of the jelly tank to approximately the plane of the jelly plunger 126 (see Figs. 3, 23 and 24). To the top of such plunger is secured a rod having end trunnions 171 projecting outwardly beyond the plane of the side walls of the plunger and valve housing, and a pair of links 172 pivoted to said trunnions and the rock arms 170 complete the connections by which the jelly plunger is operated.

Within the cam slot 164 (which controls the jelly supply valve) is arranged a roller pivoted on a depending triangular extension 166ª of a curved rocking adjusting frame 166 (see Figs. 3 and 8) which is pivoted on the outer portion of the fixed cross shaft 132 before mentioned. This frame 132 is provided with a slideway and curved follower block in which is mounted a pivot block providing a pivotal connection with a connecting rod 167, and with adjusting means for shifting the pivot block which are identical with the adjusting means mounted in frame 144, hereinbefore described. The rod 167 is pivoted at its top to a crank 176 which rocks a rock shaft 177 journaled in fixed bearings in the frame 1, (see Figs. 3, 5, 8, 23 and 24) upon which rock shaft are fastened two rock arms 178 which are pivotally connected to trunnions formed at the ends of a bar secured to the top of the jelly supply valve, the pivotal connection of the trunnions being sufficiently loose to permit linear movement of the valve.

The cam slot 162 in the double cam 161 controls the jelly shut-off valve 128 in the following manner. A rocking lever 179 (see Fig. 3) pivoted between its ends upon the rock shaft 69 is equipped at one end with a roller engaging said cam slot and at the other end is pivoted to a connecting rod 180, which connecting rod at its top end is pivoted to a crank 181 fast upon a rock shaft 182 journaled at its ends in bearings formed in the side members of the frame of the machine (see Figs. 3, 23 and 24). A pair of rock arms 183 secured to the rock shaft and pivotally connected at their lower ends to the rear of the shut-off valve completes the connection.

The form and arrangement of the nozzles of my machine are susceptible to several variations of form and arrangement, and in Figs. 21 and 22 I have illustrated two modifications of the nozzles. In Fig. 21 the jelly nozzle is arranged to deposit a narrow ring of jelly around the icing; and in Fig. 22 the nozzles are eccentrically arranged. Moreover, the nozzles need not have a circular opening, but may be of many different shapes, such as that of a star, or an octagon, or an irregular shape representing an animal or other object, or they may be so constructed as to deposit a number of drops of the different confection, arranged in any pleasing pattern or geometrical arrangement desired.

I claim:

1. In a depositing machine, a forcing mechanism having nozzles mounted in fixed position, a pivoted table below said nozzles, a drum rotatably mounted upon said pivoted table near the rear end of the machine, means for intermittently rotating the drum, a cross bar secured in fixed position near the front end of the machine, a feed belt engaging said drum and cross bar and traveling over the top of said table, and means for rocking said table and lifting said belt into proximity with the nozzles.

2. In a depositing mechanism, an intermittent forcing mechanism having a cross row of nozzles mounted intermediate the ends of the machine, a pivoted table below said nozzles, a drum rotatably mounted on said pivoted table near the rear end of the machine, a cross bar secured in fixed position near the front end of the machine, a feed belt engaging said drum and cross-bar and traveling over the top of said table, means for rocking said table and lifting said belt into proximity with the nozzles, and means for intermittently rotating the drum alternately with the depositing action of the forcing mechanism.

3. In a depositing mechanism, an intermittent forcing mechanism having a cross row of nozzles mounted intermediate the ends of the machine, a pivoted table below said nozzles, a drum rotatably mounted on said pivoted table near the rear end of the machine, a cross bar secured in fixed position near the front end of the machine, a feed belt engaging said drum and cross-bar and traveling over the top of said table, means for rocking said table and lifting said belt into proximity with the nozzles, means for intermittently rotating the drum alternately with the depositing action of the forcing mechanism, and an endless delivery belt arranged with its top reach beneath said crossbar and in close proximity to the front bend of the feed belt.

4. In a depositing machine, a forcing mechanism having a cross row of nozzles, a pivoted table below said nozzles, a rotatable feed drum at the rear of said table, a cross bar arranged forwardly of said table and secured in fixed position, a feed belt arranged to travel over the top of said table and around said drum and said fixed bar, and means for rocking said table and lifting said belt into proximity with said nozzles.

5. In a depositing machine, a forcing mechanism having a cross row of nozzles, a pivoted table below said nozzles, a feed drum rotatably mounted in said table near the rear end of the machine, a cross bar secured in fixed position near the front end of the machine, a feed belt arranged to travel over the top of said table and around said drum and said fixed bar, and means for rocking said table and lifting said belt into proximity with said nozzles.

6. In a depositing machine, a forcing mechanism having a cross row of nozzles, a feed belt arranged to travel beneath said nozzle, means for intermittently giving said belt a feeding movement, and a spacing and positioning frame including a plurality of notched cross-bars for automatically spacing rows of wafers on and along the top of said belt in position to successively register with said nozzles at successive spacing movements.

7. In a depositing machine, a forcing mechanism having a cross row of nozzles, a feed belt arranged to travel beneath said nozzle, means for intermittently giving said belt a feeding movement, and a reciprocating and also rising and falling spacing and positioning frame including a series of notched cross-bars for automatically spacing rows of wafers on and along the top of said belt in position to successively register with said nozzles at successive spacing movements.

8. In a depositing machine, a forcing mechanism having a cross row of nozzles, a feed belt arranged to travel beneath said nozzle, means for intermittently giving said belt a feeding movement, a lifting frame vertically movable to and from the belt, and a reciprocating spacing and positioning frame mounted to slide in said lifting frame, and including a spacing and positioning notched cross-bar for automatically spacing rows of wafers on said belt in position to register with said nozzles.

9. In a depositing machine, a forcing mechanism having a cross row of nozzles, a feed belt arranged to travel beneath said nozzle, means for intermittently giving said belt a feeding movement, a lifting frame vertically movable to and from the belt, and a reciprocating spacing and positioning frame mounted to slide in said lifting frame and including a plurality of notched cross-bars for automatically spacing rows of wafers on said belt in position to register with said nozzles.

10. In a depositing machine, a forcing mechanism having a cross row of nozzles, a feed belt arranged to travel beneath said nozzle, means for intermittently giving said belt a feeding movement, a lifting frame, a reciprocating spacing and positioning frame mounted to slide in said lifting frame and including a plurality of notched cross-bars for automatically spacing rows of wafers on said belt in position to register with said nozzles, and a bail hinged to said spacing and positioning frame and with its cross member traveling along the surface of said feed belt.

11. In a depositing machine, a forcing mechanism having a cross row of nozzles, a feed belt arranged to travel beneath said nozzle, means for intermittently giving said belt a feeding movement, and a spacing and positioning frame including a plurality of notched cross-bars for automatically spacing rows of wafers on and along the top of said belt in position to successively register with said nozzles at successive spacing movements.

12. In a depositing machine, a forcing mechanism having a cross row of nozzles, a pivoted table below said nozzles, a feed belt arranged to travel over the top of said table, means for rocking said table and lifting said belt into proximity with said nozzles, a lifting frame carried by said pivoted table, and a reciprocating spacing and positioning frame slidably mounted in said lifting frame.

13. In a depositing machine, a forcing mechanism having a cross row of nozzles, a pivoted table below said nozzles, a feed belt arranged to travel over the top of said table, means for rocking said table and lifting said belt into proximity with said nozzles, a lifting frame carried by said pivoted table, a reciprocating spacing and positioning frame slidably mounted in said lifting frame, and a bail hinged at its ends to the rear end of said spacing and positioning frame and with its cross member resting upon the surface of said feed belt.

14. In a depositing machine, a forcing mechanism having a cross row of nozzles, a pivoted table below said nozzles, a feed drum rotatably mounted near the end of the machine, a fixed cross-bar near the front end of the machine, a feed belt engaging said drum and cross-bar and arranged to travel over the top of said pivoted table, means for rocking said table and lifting said belt into proximity with said nozzles, a lifting frame carried by said table, and a reciprocating spacing and positioning frame slidably mounted in said lifting frame.

15. In a depositing machine, a forcing mechanism having a cross row of nozzles, a pivoted table below said nozzles, a feed drum rotatably mounted in said pivoted table near the rear end of the machine, a fixed cross-bar near the front end of the machine, a feed belt engaging said drum and cross-bar and arranged to travel over the top of said pivoted table, means for rocking said table and lifting said belt into proximity with said nozzles, a lifting frame carried by said table, and a reciprocating spacing and positioning frame slidably mounted in said lifting frame.

16. In a depositing machine, a forcing mechanism having a cross row of nozzles, a feed belt arranged to travel under said nozzles, a lifting frame, means for lifting said frame comprising a pair of bell-crank levers 31, a second pair of bell-crank levers 32, a link connection between said pairs of bell-cranks, a cross-rod 35 and operating connections connected to said rod, and a reciprocating spacing and positioning frame slidably mounted in said lifting frame.

17. In a depositing machine, a forcing mechanism having a cross row of nozzles, a pivoted table below said nozzles, a feed belt arranged to travel over the top of said table, means for rocking said table and lifting said belt into proximity with said nozzles, a lifting frame carried by said pivoted table, means for lifting said lifting frame comprising a pair of bell-crank levers 31, a second pair of bell-crank levers 32, a link connection between said pairs of bell-cranks, a cross-rod 35 and operating connections connected to said rod, and a reciprocating spacing and positioning frame slidably mounted in said lifting frame.

18. In a machine of the character described and having a feed belt, a feed table, a trap slide at the front end of said table overhanging said belt, a rail arranged in front of said trap slide, a yielding connection between said rail and said table, and means for reciprocating said trap slide.

19. In a machine of the character described, and having a feed belt, a feed table frame, a feed table mounted in said frame and having a sliding adjustment therein, a trap slide mounted in said frame and overhanging said feed belt at the front end of the table, a rail slidably mounted in said frame and normally abutting the front edge of said trap slide, a spring connection permitting said rail to yield forwardly, and means for reciprocating said trap slide.

20. In a depositing machine, a forcing mechanism having a cross row of nozzles, a feed belt arranged to travel beneath said nozzles, a reciprocating and also rising and falling spacing and positioning frame, a bail hinged to said frame with its cross member traveling along the surface of said feed belt, a feed table carried by said pivoted table at its rear end, a trap slide at the front of said feed table overhanging the path of travel of the bail upon the belt, and means for reciprocating said trap slide.

21. In a depositing machine, a forcing mechanism having a cross row of nozzles, a feed belt arranged to travel beneath said nozzles, a lifting frame, a reciprocating spacing and positioning frame mounted to slide in said lifting frame, a bail hinged to said spacing and positioning frame with its cross member traveling along the surface of said feed belt, a feed table carried by said pivoted table at its rear end, a trap slide at the front of said feed table overhanging the path of travel of the bail upon the belt, and means for reciprocating said trap slide.

22. In a depositing machine, a forcing mechanism having a cross row of nozzles, a pivoted table below said nozzles, a feed belt arranged to travel over the top of said pivoted table, means for rocking said table and lifting said belt into proximity to said nozzles, a lifting frame carried by said pivoted table, a reciprocating spacing and positioning frame slidably mounted in said lifting frame, a bail hinged at its ends to said spacing and positioning frame and with its cross member resting upon said feed belt, a feed table carried by said pivoted table at its rear end, a trap slide at the front of said feed table overhanging the path of travel of the bail upon the belt, and means for reciprocating said trap slide.

23. In a machine of the character described, forcing mechanism comprising a rectangular forcing chamber extending transversely of the machine, a supply receptacle having a supply passage communicating with said forcing chamber through a supply port at the lower end of such chamber, a flat plunger arranged in said forcing chamber, a flat supply valve governing said supply port, discharge passages and nozzles common to said chamber and arranged to be placed in and out of communication therewith and a common shut-off valve governing such communication.

24. In a machine of the character described, forcing mechanism comprising a rectangular forcing chamber extending transversely of the machine, a supply receptacle having a supply passage communicating with said forcing chamber through a supply port formed in the lower part of a vertical face of said chamber, a flat plunger vertically arranged in said forcing chamber, a vertically arranged flat supply valve governing said supply port, a series of discharge ports at the bottom of said forcing chamber and common thereto communicating with discharge nozzles, and a horizontal shut-off valve arranged to cover and uncover said discharge ports.

25. In a machine of the character described, forcing mechanism comprising a rectangular forcing chamber extending transversely across the machine, a supply receptacle having a supply passage communicating with said forcing chamber through a supply port at the lower end of said chamber, a flat plunger closing at the top the larger part of said forcing chamber, a flat supply valve governing said supply port arranged to reciprocate parallel with and contiguous to said plunger and closing the remainder of the top of said chamber, a nozzle-bar forming the bottom wall of said forcing chamber and equipped with a plurality of discharge nozzles, and a shut-off valve governing such nozzles.

26. In a machine of the character described, a casing formed with two supply receptacles inclosing a rectangular housing space lying between said receptacles and extending transversely of the machine, a partition dividing such space into two forcing chambers, the supply receptacles communicating respectively with the adjacent forcing chambers through supply ports at the lower ends of such chambers, a flat plunger in each forcing chamber closing at the top the larger part of such chamber, a flat supply valve in each chamber governing its supply port arranged to reciprocate parallel with and lying contiguous to the plunger and closing the remainder of the top of the chamber, a series of discharge nozzles communicating with one forcing chamber, and a second series of nozzles communicating with the other forcing chamber and arranged adjacent said first series.

27. In a machine of the character described, a casing formed with two supply receptacles inclosing a rectangular housing space lying between said receptacles and extending transversely of the machine, a partition dividing such space into two forcing chambers, the supply receptacles communicating respectively with the adjacent forcing chambers through supply ports at the lower ends of such chambers, a flat plunger in each forcing chamber closing the larger part of such chamber, a flat supply valve in each chamber governing its supply port and lying contiguous to the plunger and closing the remainder of the chamber, a series of discharge nozzles communicating with one forcing chamber, and a second series of nozzles communicating with the other forcing chamber and arranged inside of and concentric with the nozzles of the first series.

28. In a machine of the character described, a casing member formed with side walls and a back wall inclosing a supply receptacle, a second casing member formed with side walls and a back wall spaced apart from the back wall of said first-mentioned casing member, such walls inclosing a second supply receptacle, the lower portions of the side walls of the two members being extended to meet and form end walls of two forcing chambers arranged centrally between the lower portions of said receptacles, and forcing mechanisms housed in said chambers.

29. In a machine of the character described, a casing member formed with side walls and a back wall inclosing a supply receptacle, a second casing member formed with side walls and a back wall spaced apart from the back wall of said first-mentioned casing member, such walls inclosing a second supply receptacle, the lower portions of the side walls of the two members being extended to meet and form end walls of two rectangular forcing chambers arranged centrally between the lower portions of said receptacles extending transversely of the machine, a nozzle-bar forming the bottom wall of such forcing chambers, and forcing mechanisms housed in said chambers.

30. In a machine of the character described, a casing member formed with side walls and a back wall inclosing a supply receptacle, a second casing member formed with side walls and a back wall spaced apart from the back wall of said first-mentioned casing member, such walls inclosing a second supply receptacle, the lower portions of the side walls of the two members being extended to meet and inclose a rectangular housing space extending transversely of the machine, a partition dividing such space into two forcing chambers, and a nozzle-bar underlying said partition and forming the bottom wall in each housing chamber, said nozzle-bar being equipped with two sets of concentrically arranged nozzles communicating respectively with the two forcing chambers.

31. In a machine of the character described, forcing mechanism comprising a forcing chamber and discharge nozzle, a plunger in said chamber, means for reciprocating said plunger with a gradual movement, a supply valve, means for opening said supply valve with a relatively quick movement after the suction stroke of the plunger has begun, a shut-off valve governing the discharge nozzle, and means for closing said shut-off valve quickly as the supply valve begins to open.

32. In a depositing machine, a feed belt, means for intermittently shifting said belt, a cross row of depositing nozzles, spacing and positioning means for shifting a plurality of cross rows of wafers on said belt and bringing the front row into alinement with said depositing nozzles, forcing mechanism for depositing charges of confection through said nozzles in intervals of rest of the belt, and means for lifting said belt into proximity to said nozzles while the confection is being deposited therethrough.

33. In a machine of the character described and including a pivoted table 2, means for rocking said table comprising a rotating shaft 54, a cam 67 fixed to said shaft, a rock arm 68 adjustable with respect to a rock shaft 69, rock arms 72 fixed to said rock shaft, and links 73 pivoted to the front end of said table.

34. In a machine of the character described and including a feed table having a trap slide 13, means for suddenly reciprocating said slide comprising a rotating shaft 54, a cam 74 fixed to said shaft, said cam having a long dwell and a relatively short active surface, a rocking lever 75 having intermediate its length a cam roller engaging the cam 74, a link 76, an oscillating lever 77, a link 23, and a lever 19, the upper end of which engages said slide.

35. In a machine of the character described and including a lifting frame 30, means for raising and lowering said frame comprising a cam plate 81 fixed to a rotating shaft 54, a bell-crank lever 82 having at the end of one arm a cam roller engaging said cam plate, a link 36, a cross rod 35, a pair of bell-crank levers 32 pivoted to one end of said frame 30, a pair of links 31, and a second pair of levers 31 pivoted to the other end of said frame 30.

36. In a machine of the character described and including a spacing and positioning frame 390, means for reciprocating said frame comprising an oscillating frame 57, a link 83, an adjustable jointed rocking lever 84 keyed to a rock shaft 78, rock arms 85, 88 fixed to said shaft, and a pair of links 89 pivoted to said frame.

37. In a machine of the character described, a lifting frame 30, a spacing and positioning frame 390 mounted to reciprocate in said lifting frame, means for raising and lowering said lifting frame, means for reciprocating said spacing and positioning frame, and means for varying the length of stroke of such last-mentioned frame.

38. In a machine of the character described, a lifting frame 30, a spacing and positioning frame 390 mounted to reciprocate in said lifting frame, operating means for reciprocating said spacing and positioning frame, and operating means for lifting said lifting frame quickly at the end of a forward movement of the spacing and positioning frame and maintaining it in elevated position throughout the rearward stroke of such spacing and positioning frame and then dropping the lifting frame to lowermost position before the beginning of the next forward stroke of the spacing and positioning frame.

39. In a machine of the character described and including a forcing mechanism having a plunger 123, means for reciprocating said plunger comprising a rotating shaft 51, a pair of eccentrics 129 fixed to opposite ends of said shaft, a pair of connecting rods 130, a pair of pivoted rocking frames 131, a pair of pivot blocks mounted in said frames, a pair of rods 138 pivoted to a sliding cross bar 139, and a pair of rods 141 secured to the top of said plunger.

40. In a machine of the character described and including a forcing mechanism having a plunger 123, means for reciprocating said plunger including a pair of rocking frames 131 pivoted at opposite sides of the machine and formed with slideways, a pair of pivot blocks sliding in said ways and formed with screw-threaded bores, a pair of screw rods journaled in said frames and engaging said bores, one end of each screw being equipped with a bevel pinion, a cross rod journaled in extensions of said frames and provided with bevel pinions engaging said first-mentioned pinions and with a hand wheel whereby simultaneous adjustment of said pivot blocks may be effected, and a pair of connecting rods 138 connected to said plunger.

41. In a machine of the character described and including a forcing mechanism having a supply valve 124, means for reciprocating said valve comprising a rotating shaft 51, a cam 142 secured thereto, a pivoted frame 144 equipped with a cam roller engaging said cam 142, a connecting rod 147 adjustably pivoted on said frame 144 and at its other end pivoted to a crank arm 148 secured to a rock shaft 149 which is provided with rock arms 150, and a pair of links 151 pivoted to said rock arm and to said valve.

42. In a machine of the character described and including a forcing mechanism having a shut-off valve 125, means for reciprocating said valve comprising a rotating shaft 51, a cam disk 152 secured thereto, a pivoted lever 154 provided intermediate its ends with a cam roller engaging said cam 152, a link 155, and a rock arm 156 fixed to a cross rock shaft 157 which has a pair of rock arms 158 connected to the outer edges of said valve.

43. In a machine of the character described, a depositing mechanism including a plunger, a supply valve and a shut-off valve, a second depositing mechanism comprising a plunger, a supply valve and a shut-off valve, operating connections for operating the plunger, supply valve and shut-off valve of one of said depositing mechanisms, a rotating member angularly adjustable with respect to a rotating driving element of the machine, and connections operatively connected with said adjustable member for operating the plunger, supply valve and shut-off valve of the other depositing mechanism.

44. In a machine of the character described, a depositing mechanism including the plunger 123, supply valve 124, and shut-off valve 125, a second depositing mechanism including the plunger 126, supply valve 127, and shut-off valve 128, a shaft 51, eccentrics 129, 129 secured to said shaft and intermediate connections for operating said plunger 123, a cam 142 fixed to said shaft and intermediate connections for operating said supply valve 124, a cam 152 fixed to said shaft and intermediate connections for operating said shut-off valve 125, a sleeve 160 angularly adjustable with respect to said shaft 51, cams 164, 161 and 162 fixed to said sleeve, and connections between said cams and plunger 126, supply valve 127 and shut-off valve 128, respectively for operating said last-mentioned elements.

FERDINANDO G. SALERNO.

Witnesses:
  LOUIS B. ERWIN,
  ROBERT DOBBERMAN.